(12) United States Patent
Ryals et al.

(10) Patent No.: US 8,893,202 B2
(45) Date of Patent: *Nov. 18, 2014

(54) METHODS, COMPUTER PROGRAM PRODUCTS, AND APPARATUS FOR PROVIDING BROADBAND TELEVISION SERVICE

(71) Applicant: AT&T Intellectual Property I, L.P., Atlanta, GA (US)

(72) Inventors: Steven Ryals, Cropwell, AL (US); Donald Scott Smith, Cullman, AL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/929,039

(22) Filed: Jun. 27, 2013

(65) Prior Publication Data

US 2013/0291039 A1     Oct. 31, 2013

Related U.S. Application Data

(63) Continuation of application No. 12/200,967, filed on Aug. 29, 2008, now Pat. No. 8,484,690.

(51) Int. Cl.
*H04N 7/173* (2011.01)
*H04N 21/61* (2011.01)
*H04N 21/482* (2011.01)
*H04N 21/239* (2011.01)
*H04N 21/2668* (2011.01)

(52) U.S. Cl.
CPC ....... *H04N 21/6125* (2013.01); *H04N 7/17318* (2013.01); *H04N 21/482* (2013.01); *H04N 21/2393* (2013.01); *H04N 21/2668* (2013.01); *H04N 21/6175* (2013.01)
USPC ........... 725/111; 725/105; 725/113; 725/135; 709/217

(58) Field of Classification Search
CPC .......... H04N 21/2393; H04N 21/2668; H04N 21/482; H04N 21/6125; H04N 21/6175; H04N 7/17318
See application file for complete search history.

(56) References Cited

U.S. PATENT DOCUMENTS

| | | |
|---|---|---|
| 2003/0041334 A1 | 2/2003 | Lu |
| 2004/0201239 A1 | 10/2004 | Pellegrin, Jr. |
| 2004/0205155 A1 | 10/2004 | Nobakht et al. |
| 2006/0070066 A1 | 3/2006 | Grobman |
| 2007/0199042 A1 | 8/2007 | Yip |
| 2008/0036851 A1 | 2/2008 | Patel |

*Primary Examiner* — Joshua Taylor
(74) *Attorney, Agent, or Firm* — Cantor Colburn LLP

(57) ABSTRACT

Methods, computer program products and apparatus for providing broadband television service (BTS) are provided. The method includes receiving a channel selection at a receiver located at a service location. The channel selection is correlated to an Internet address. Data is requested from the Internet address. The request is made to a digital subscriber line (DSL) network via a modem. Video data packets containing live streaming video content are received from the Internet address in response to the requesting. The video data packets are received from the DSL network via the modem. The video data packets are assembled into video signals for display on a television and the video signals are transmitted to the television.

1 Claim, 10 Drawing Sheets

METHODS, COMPUTER PROGRAM PRODUCTS, AND APPARATUS FOR PROVIDING BROADBAND TELEVISION SERVICE

CROSS REFERENCE TO RELATED APPLICATIONS

This application is a continuation of U.S. patent application Ser. No. 12/200,967, the entire contents of which are incorporated herein by reference.

BACKGROUND

Exemplary embodiments relate generally to digital television, and more particularly to providing broadband television services (BTS).

Internet protocol television (IPTV) service is a digital television delivery service, where the digital television signal is delivered to users via a computer network infrastructure using the Internet Protocol. Typically, IPTV services are bundled with additional Internet services, such as Internet web access and voice over Internet protocol (VoIP). Subscribers and users of subscriber devices receive IPTV services via a set top box, or IPTV receiver that is connected to or incorporated in the same device as a television or display device for the reception of a digital signal. Used in conjunction with an IP-based platform, the set top box allows for a subscriber or other user to access IPTV services and any additional services that are integrated within the IPTV service.

Typically, additional network hardware (e.g., video ready access devices or "VRADS") must be installed to support IPTV. This additional hardware is often costly and manpower is required to perform the installations. Further, having to install additional hardware may impact the ability of an IPTV service provider to quickly gain entry into the IPTV marketplace and to keep up with the demand for IPTV services. In order to alleviate these cost and timing issues, it would be advantageous to be able to provide IPTV services by utilizing existing network infrastructures.

BRIEF SUMMARY

Exemplary embodiments include a method for providing broadband television service (BTS). The method includes receiving a channel selection at a receiver located at a service location. The channel selection is correlated to an Internet address. Data is requested from the Internet address. The request is made to a digital subscriber line (DSL) network via a modem. Video data packets containing live streaming video content are received from the Internet address in response to the requesting. The video data packets are received from the DSL network via the modem. The video data packets are assembled into video signals for display on a television and the video signals are transmitted to the television.

Additional exemplary embodiments include a system for providing BTS. The system includes a modem in communication with a DSL network and a receiver. The receiver includes a channel selection interface for receiving a channel selection at the receiver. The receiver is located at a service location. The receiver also includes a channel selection correlator for correlating the channel selection to an Internet address. A data requestor in the receiver requests data from the Internet address. The requesting is to the DSL network via the modem. The receiver also includes a data receiver for receiving video data packets containing live streaming video content from the Internet address in response to the requesting. The video data packets are received from the DSL network via the modem. The receiver further includes computer instructions for assembling the video data packets into video signals for display on a television at the service location, and for transmitting the video signals to the television.

Further, exemplary embodiments include a computer program product, tangibly embodied on a computer readable medium, for providing BTS. The computer program product has instructions for causing a computer to execute a method, which includes receiving a channel selection at a receiver located at a service location. The channel selection is correlated to an Internet address. Data is requested from the Internet address. The request is made to a digital subscriber line (DSL) network via a modem. Video data packets containing live streaming video content are received from the Internet address in response to the requesting. The video data packets are received from the DSL network via the modem. The video data packets are assembled into video signals for display on a television and the video signals are transmitted to the television.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGs..

The detailed description explains the exemplary embodiments, together with advantages and features, by way of example with reference to the drawings.

DETAILED DESCRIPTION OF EXEMPLARY EMBODIMENTS

Exemplary embodiments provide the ability to implement broadband television service (BTS) by utilizing an existing broadband service. Internet addresses containing streaming live video content are accessed and the contents are displayed on a television. Each of the Internet addresses to be accessed is correlated to a channel on the television. When the television viewer changes the channel a different Internet address containing streaming live video is accessed and displayed on the television. In this manner, a single service provider may provide broadband Internet service, BTS and telephone service to a service location via an existing DSL network.

Figure 1:
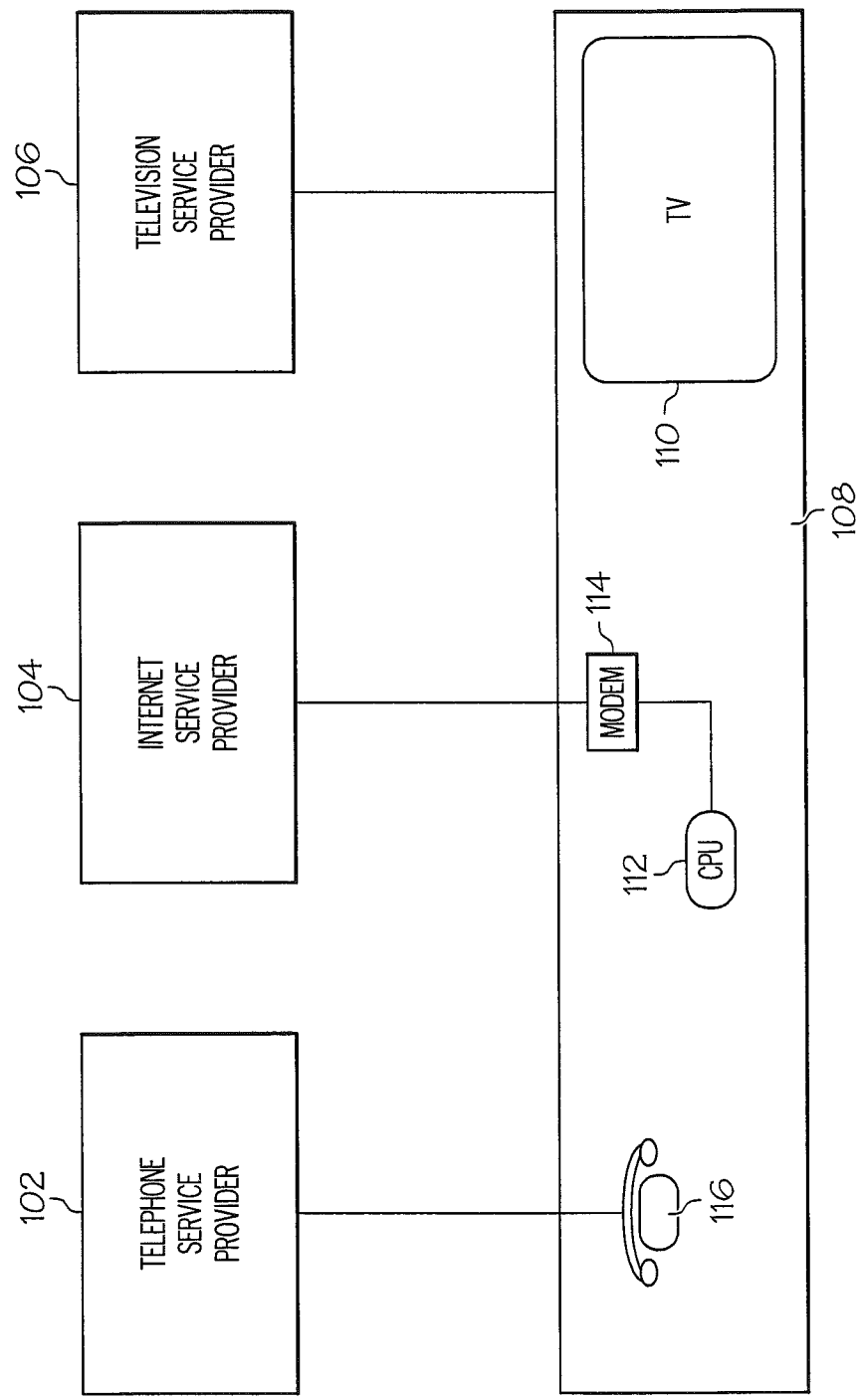
FIG. 1 illustrates a block diagram of a system for providing telephone service, Internet service and television services at a service location.

FIG. 1 illustrates a block diagram of a system for providing telephone service, Internet service and television service at a service location 108 (e.g., a home). As depicted in FIG. 1, each of these services is being provided by a different service provider. A telephone 116 is in communication with a telephone service provider 102 via a phone line or other means. A computer 112 is connected to a modem 114, and the modem is in communication with an Internet service provider (ISP) 104 in a wired or wireless manner. Television service is being provided by connecting a television 110 (e.g., via a cable or satellite dish) to a television service provider 106. The scenario depicted in FIG. 1 requires multiple hardware devices and connections at the service location 108, as well as interaction with multiple service providers.

Figure 2:
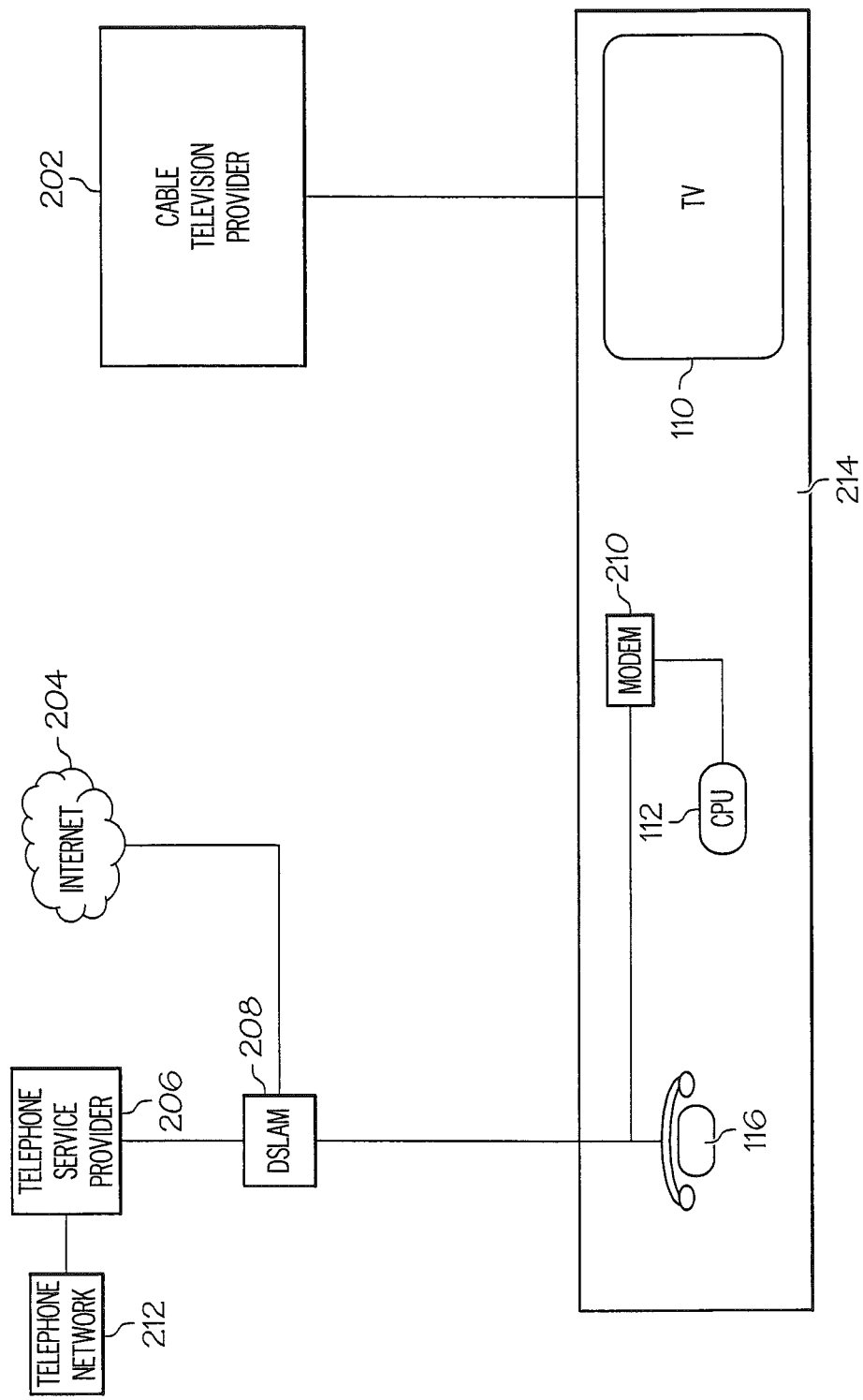
FIG. 2 illustrates a block diagram of a system for providing combined broadband Internet and telephone services, and a cable television connection at a service location.

FIG. 2 illustrates a block diagram of a system for providing combined broadband Internet and telephone services, and a cable television connection at a service location 214. As depicted in FIG. 2, telephone and Internet service is being provided by a telephone service provider 206. A digital subscriber line access multiplexer (DSLAM) 208 is in communication with a telephone 116 and a modem 210 via a digital subscriber line (DSL). The modem 210 is connected to the computer 112 for providing Internet service to the computer 112. In an exemplary embodiment, the modem 210 is an asymmetric digital subscriber line (ADSL) modem. The network device at the DSLAM 208 allows telephone lines to make faster communications to the Internet and is typically utilized to connect multiple customer DSLs to a high-speed Internet 204 backbone. The DSLAM 208 also provides communication to the telephone service provider 206 that provides access to a telephone network 212. As depicted in FIG. 2, television service is being provided by a cable television provider 202 in communication with the television 110 at the service location 214. The scenario depicted in FIG. 2 requires the service location 214 to interface with two service providers.

Figure 3:
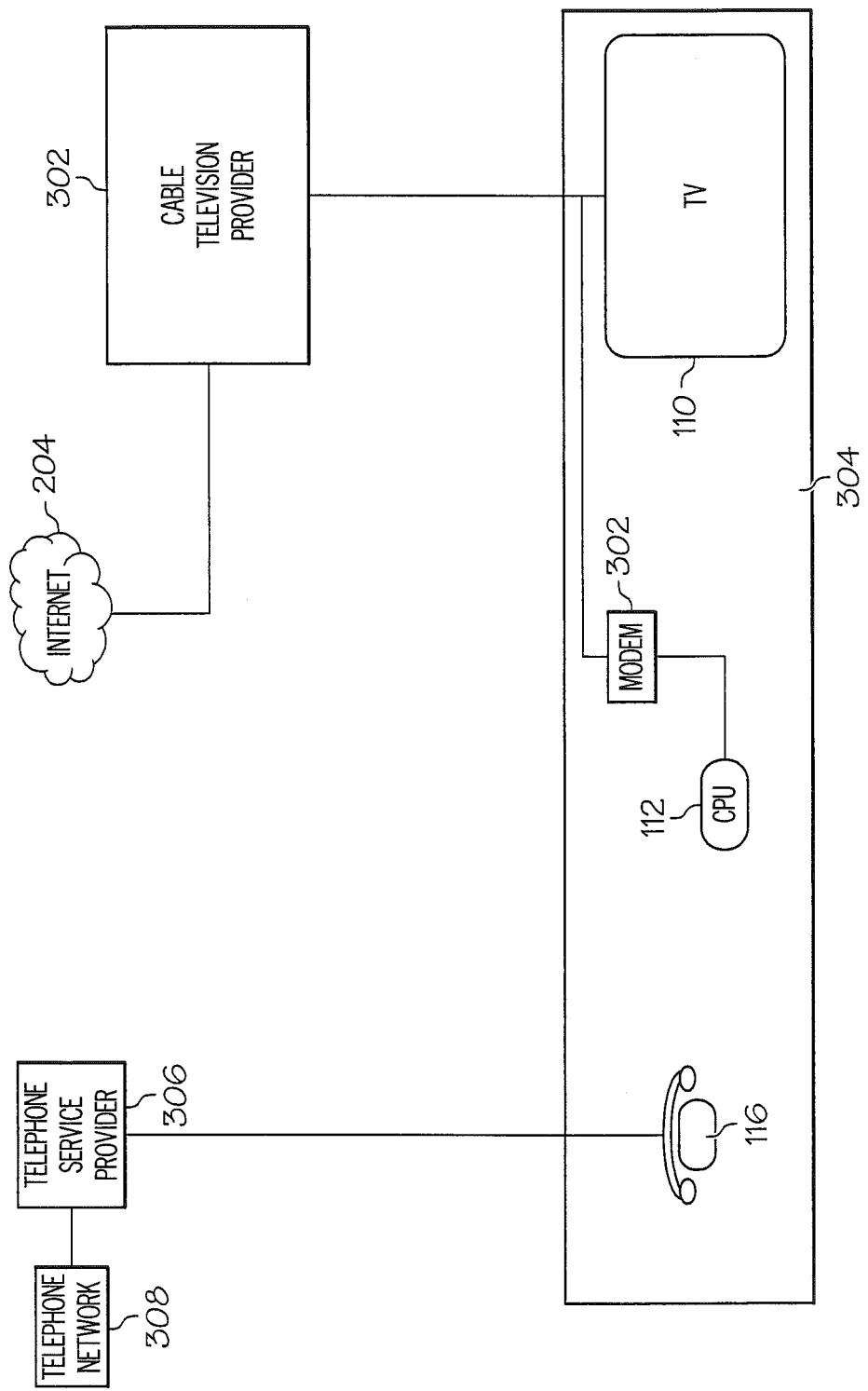
FIG. 3 illustrates a block diagram of a system for providing combined broadband Internet and television services, and a stand alone telephone service at a service location.

FIG. 3 illustrates a block diagram of a system for providing combined broadband Internet and cable television services, and a stand-alone telephone service at a service location 304. As depicted in FIG. 3, Internet service and television service is being provided by a cable television provider 302, and telephone service is being provided by a telephone service provider 306. The telephone service provider 306 is in communication with a telephone network 308 for routing telephone calls from the telephone 116 at the service location 304. The service location 304 also includes a modem 302 for communicating between the computer 112 and the cable television provider 302. The scenario depicted in FIG. 3 requires the service location 304 to interface with two service providers. Further, although not shown in the figure, additional hardware is typically required to implement the configuration shown in FIG. 3.

Figure 4:
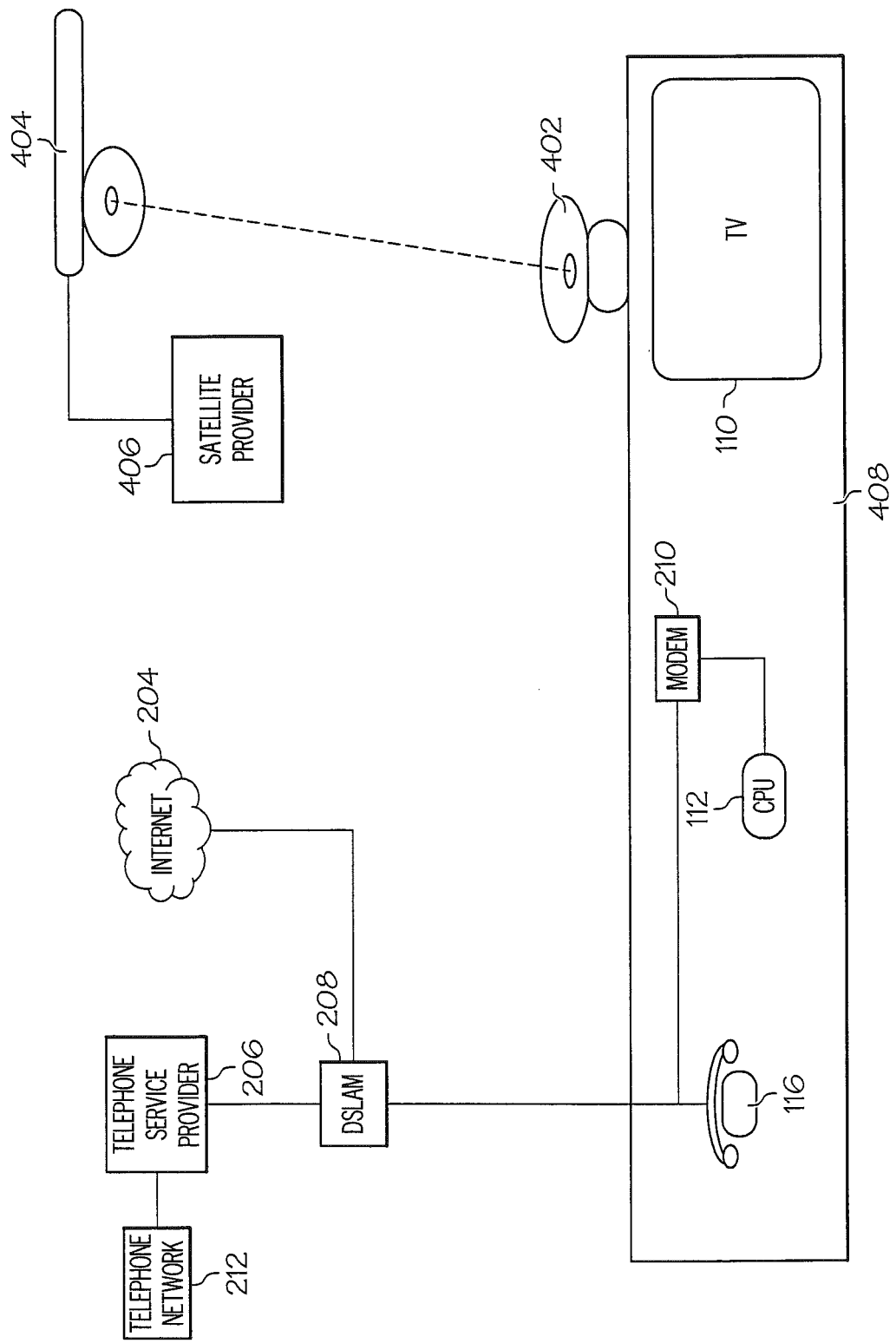
FIG. 4 illustrates a block diagram of a system for providing combined broadband Internet and telephone services, and a satellite television connection at a service location.

FIG. 4 illustrates a block diagram of a system that is similar to the system depicted in FIG. 2, except that the television service is being provided by a satellite provider 406. As depicted in FIG. 4, satellite television service is being received by a satellite receiver 402 in communication with a television, such as the television 110, at a service location 408. The satellite receiver 402 is in communication with a satellite dish 404, which in turn is in communication with the satellite provider 406 to provide the satellite service. The scenario depicted in FIG. 4 requires the service location 408 to interface with two service providers.

Figure 5:
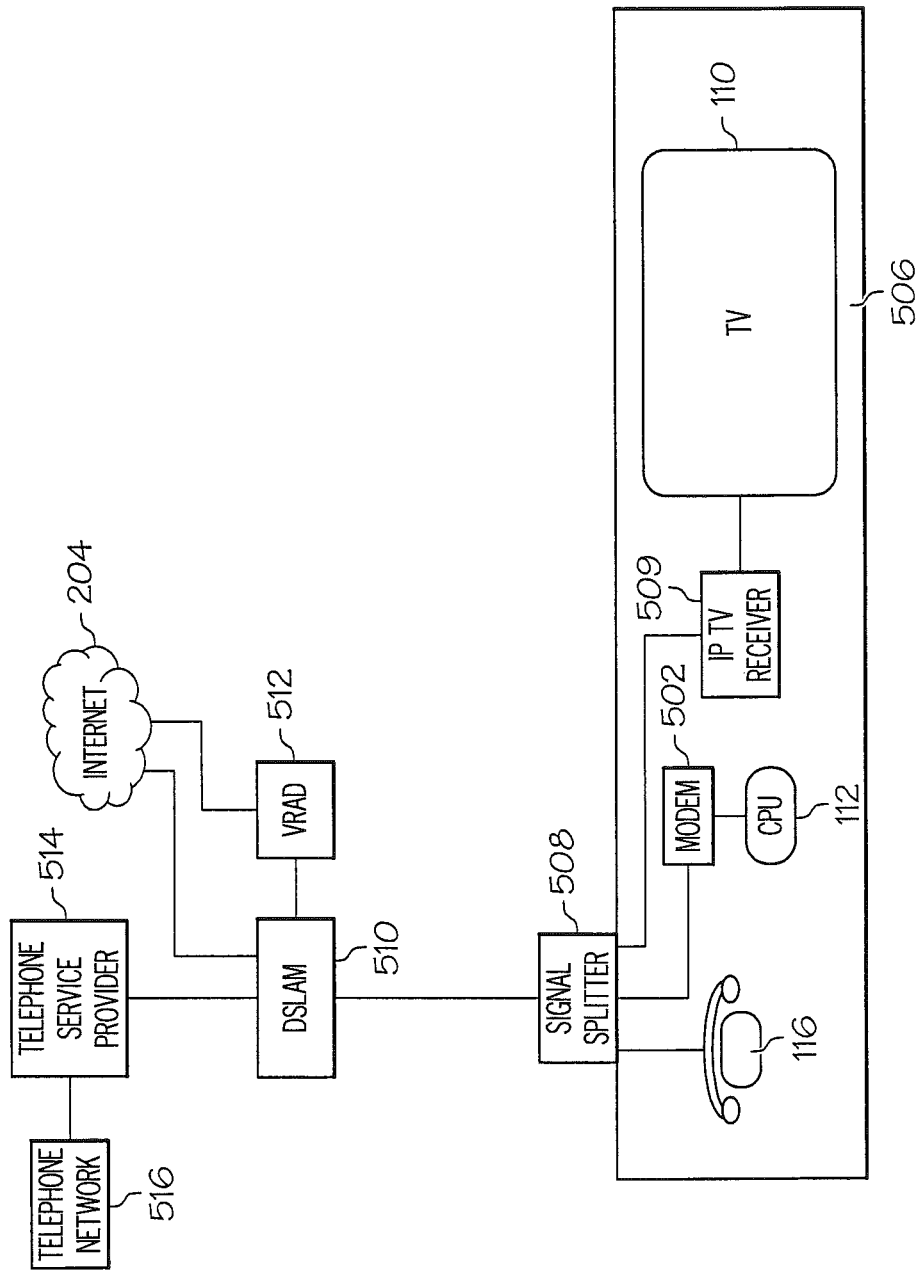
FIG. 5 illustrates a block diagram of a system that provides broadband Internet service, IPTV service, and telephone service to a service location from a single telephone service provider.

FIG. 5 illustrates a block diagram of a system that provides broadband Internet service, IPTV service and telephone service to a service location 506 from a single telephone service provider 514. The telephone 116, a modem 502 (connected to the computer 112) and an IPTV receiver 509 (connected to the television 110) are in communication with a signal splitter 508. In an exemplary embodiment, the modem 502 is an ADSL modem. The IPTV receiver 509 receives IP video packets and assembles them into video signals that can be displayed on the television 110. The signal splitter 508 depicted in FIG. 5 is in communication with a DSLAM 510 (e.g., via a copper twisted pair) for providing access to a telephone network 516 via the telephone service provider 514. The telephone signals are typically passed through the DSLAM 510 to the telephone service provider 514.

The DSLAM 510 in FIG. 5 is also in communication with the Internet 204 (e.g., via an internet service provider or "ISP") and a video ready access device (VRAD) 512. The VRAD 512 is utilized to provide IPTV services to the service location 506. A drawback to the scenario depicted in FIG. 5 is that it requires a relatively costly VRAD device to be installed within a specified distance of the service location 506. Another drawback is that it requires the use of the signal splitter 508 at the service location 506 to direct the signals to the correct device (telephone 116, computer 112 or IPTV receiver 509).

Figure 6:
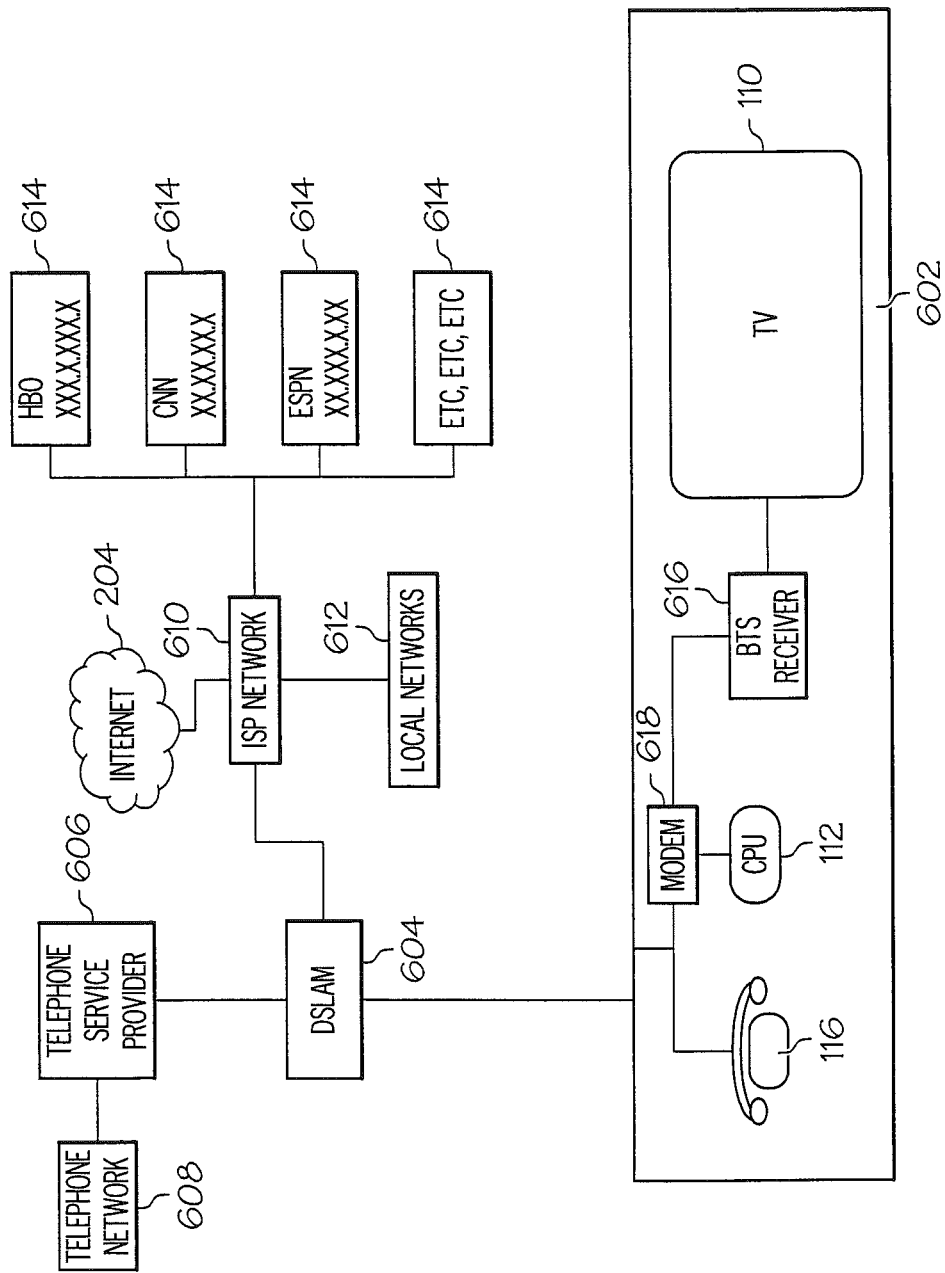
FIG. 6 illustrates a system for providing broadband television service (BTS) that may be implemented by exemplary embodiments.

FIG. 6 illustrates a system for providing BTS using a DSL network, this system may be implemented by exemplary embodiments. As used herein, the term "DSL network" refers to a network that does not include a VRAD. The system depicted in FIG. 6 provides BTS by utilizing an existing broadband service, thus eliminating the need for a VRAD. The system depicted in FIG. 6 provides broadband Internet service, BTS service and telephone service to a service location 602 from a single telephone service provider 606 via a DSLAM 604. The components located at the service location 602 include the telephone 116, modem 618 (connected to the computer 112) and a BTS receiver 616 (connected to the television 110). The connection between the modem 618 and the DSLAM 604 may be via a copper twisted pair, via fiber where available, or via any other type of physical connection. The system depicted in FIG. 6 allows for a single service provider, the telephone service provider 606, to provide all telephone, television and Internet services via a single connection to a DSLAM 604.

In the embodiment depicted in FIG. 6, the modem 618 is the same DSL modem 210 described previously with respect to FIG. 2. The BTS receiver 616 is modified to accept streaming video for conversion into a format utilized by the television 110. In addition, the BTS receiver 616 communicates to the existing DSL modem 618 and it may also provide other functionality as described herein.

The DSLAM 604 depicted in FIG. 6 allows the telephone 116 to communicate with the telephone service provider 606 and with a telephone network 608.

In addition, the DSLAM 604 provides a connection from the computer 112 to the Internet 204 via an ISP network 610. Thus, the configuration of the hardware related to the telephone and Internet services at the service location 602 depicted in FIG. 6 is similar to the configuration depicted in FIG. 2.

The links depicted in FIG. 6 to provide BTS services include: the television 110, the BTS receiver 616, the modem 618, and the DSLAM 604 which communicates with the internet service provider (ISP) network 610 to provide secure access to the Internet addresses (for both local television networks 612 and other television networks). In this manner both national and local television networks may be provided to the service location 602 via exemplary embodiments. The ISP network 610 is in communication with one or more Internet addresses 614 that provide live streaming video. One Internet address may contain a national sports network broadcast, another a movie network broadcast, and another local a news network broadcast.

The BTS receiver 616 is initialized (e.g., at a factory or at a customer site) to correlate particular Internet addresses 614 with particular channel selections on the television 110. For example, channel 5 on the television may correspond to the Internet address for a national news network and channel 6 may correspond to the Internet address for a local sports channel. When the television viewer selects channel 5, IP video packets containing streaming video of the current broadcast from the corresponding Internet address will be sent to the BTS receiver 616 for assembly into video signals that can be displayed on the television 110. Thus, whatever is currently playing on the channel will be sent to the BTS receiver 616. Exemplary embodiments allow BTS to simulate the current method of television broadcast, where signals for a channel are being sent continuously over the airwaves and when the television is tuned into the channel the television plays whatever is currently being broadcasted over the airwaves for that channel The BTS receiver 616 may be initialized at the factory to correlate particular Internet addresses to particular television channels. In exemplary embodiments, portions or all of the initialization may be changed at the service location by a service technician or remotely via the Internet. Any number of Internet addresses may contain streaming video and be correlated to particular television channels. In alternate exemplary embodiments, the Internet address contains streaming video from a closed circuit television to provide, for example, security monitoring. In other alternate embodiments, the television 110 may be utilized as a computer to access the Internet 204.

In exemplary embodiments video compression techniques and compression/decompression (CODEC) algorithms for reducing and/or eliminating lag and re-buffering on slower speed broadband services are utilized. In exemplary embodiments security is provided to prevent unauthorized users from accessing the streaming video at the Internet addresses.

The BTS receiver 616 in FIG. 6 may be utilized for service locations that already have a connection to a DSLAM, such as the DSLAM 604, and a modem, such as the modem 618, for communicating with the Internet 204. This allows ease of upgrade to existing customers because the new functionality is located in the BTS receiver 616 which is connected to the existing modem 618.

Figure 7:
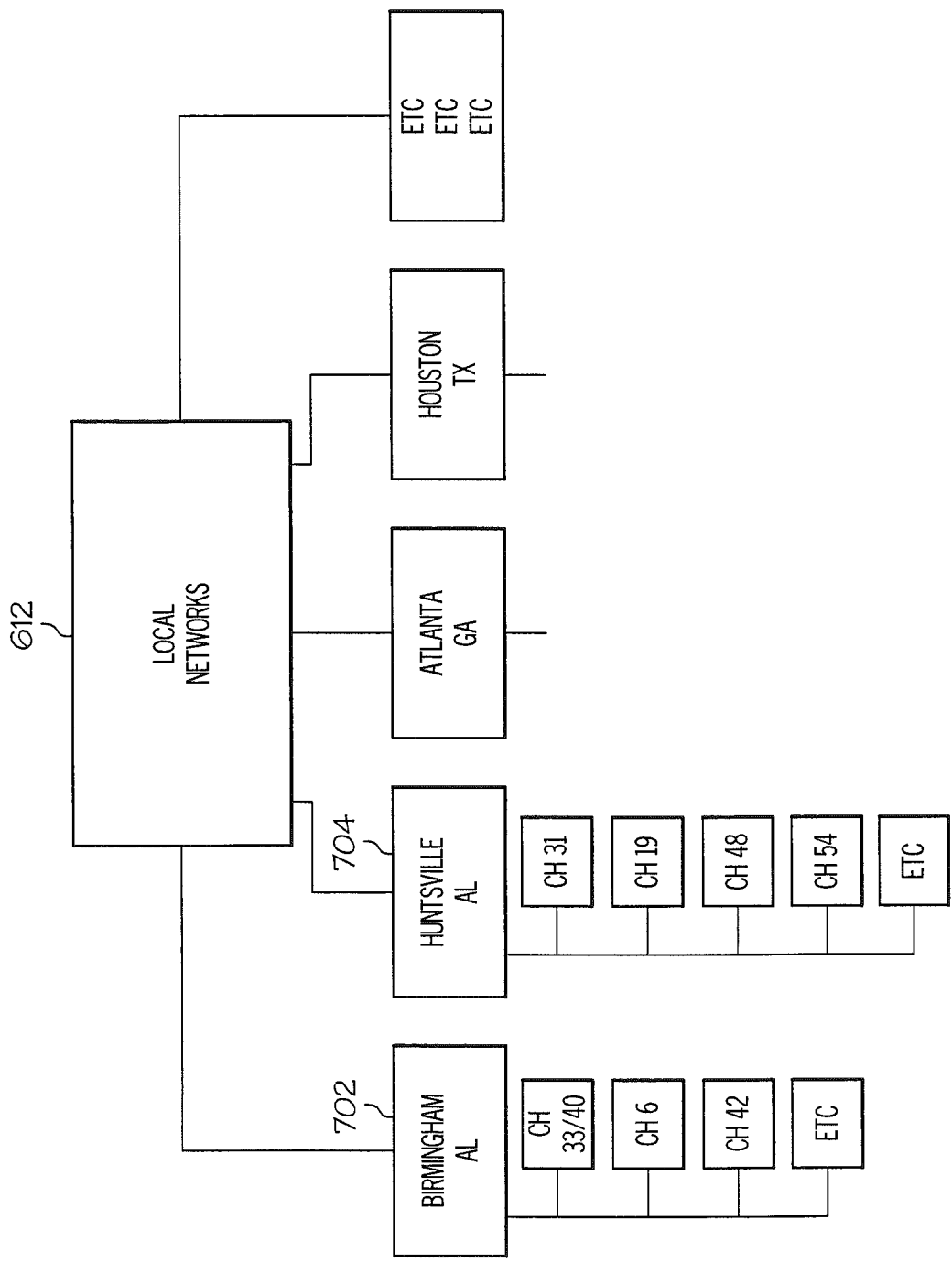
FIG. 7 depicts a configuration of local networks that may be implemented by exemplary embodiments.

FIG. 7 depicts a configuration of local networks 612 that may be implemented by exemplary embodiments. In general, a different list of local networks is provided depending on the geographic location of the service location. As depicted in FIG. 7, the list of local television networks for Birmingham, Ala. 702 include channels 33/40, 6, 42, etc., while the list of local networks for Huntsville, Ala. 704 include channels 31, 19, 48, 54, etc. Thus, in this example, a service location in Birmingham, Alabama will receive a different set of local network stations than a service location in Huntsville, Alabama. In exemplary embodiments, the set of local networks is fixed based on the geographic location of the service location. In alternate exemplary embodiments, a customer at a service location may select one or more groupings of local networks and be provided local news from a geographic location that is different than the service location.

Figure 8:
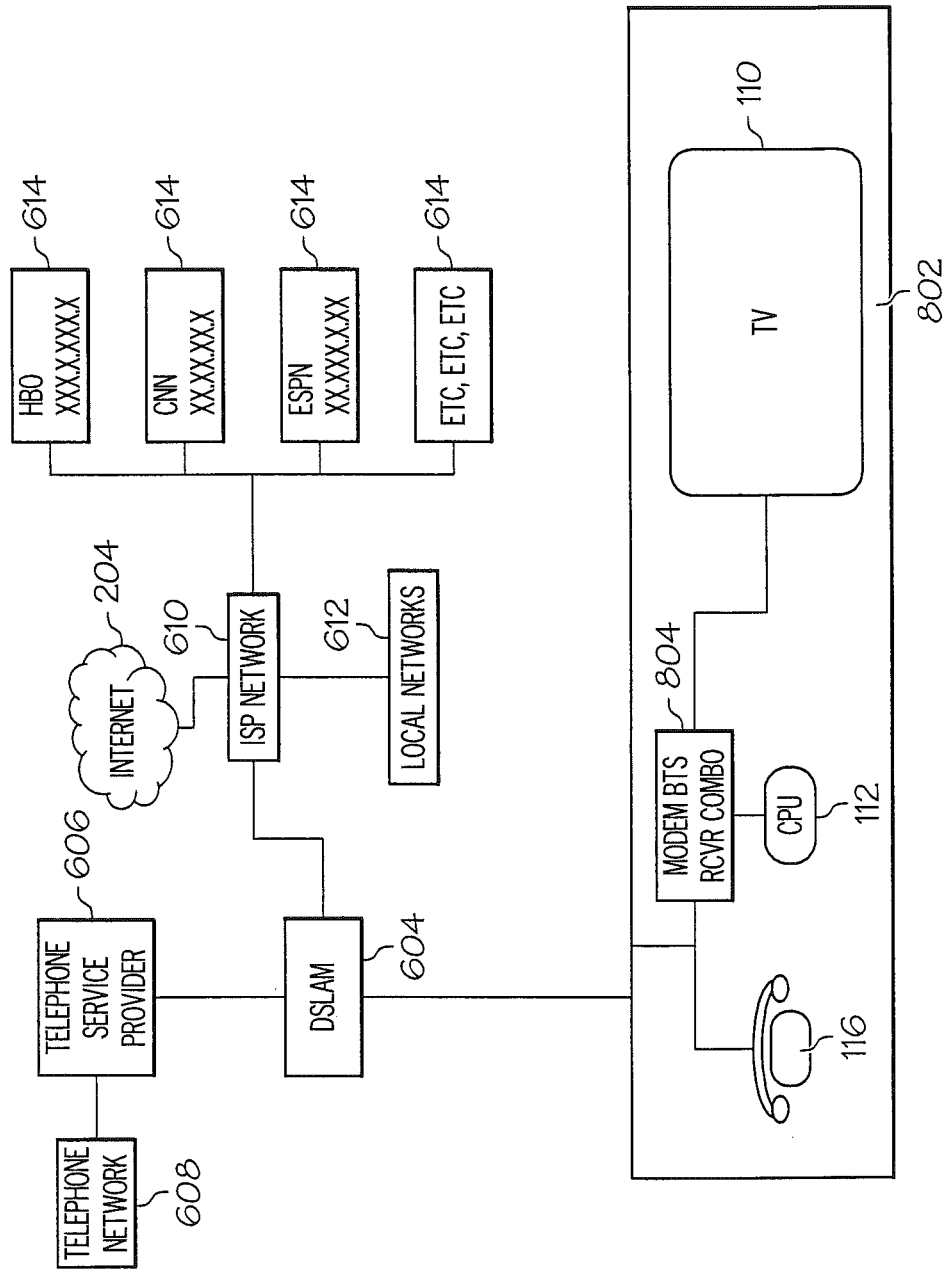
FIG. 8 illustrates a system for providing BTS that may be implemented by exemplary embodiments.

FIG. 8 illustrates a system for providing BTS that may be implemented by exemplary embodiments. The system depicted in FIG. 8 is similar to the system depicted in FIG. 6 except that the modem and BTS receiver are combined into a single combination modem/BTS receiver device 804. In this embodiment, the modem 618 and the BTS receiver 616 in FIG. 6 are combined into a single unit, the combination modem/BTS receiver device 804. This combination modem/BTS receiver device 804 may be implemented in new installations and provides at least the same functionality that was provided by the separate modem and BTS receiver.

Figure 9:
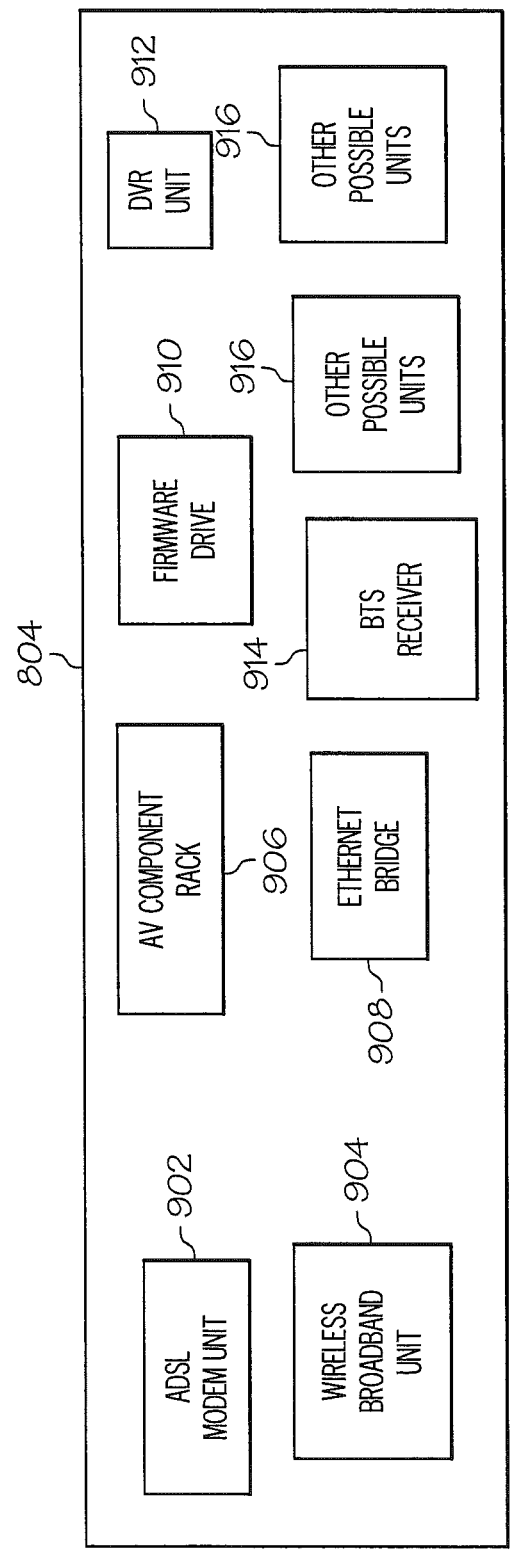
FIG. 9 illustrates a block diagram of a combination modem/BTS receiver device that may be implemented by exemplary embodiments.

FIG. 9 is a block diagram of the combination modem/BTS receiver device 804 that may be implemented by exemplary embodiments. The device 804 performs multiple functions and utilizes multiple plug-in modules. In general, according to exemplary embodiments, the modules operate independently and a module can be replaced or repaired while other modules continue to function. This will lead to ease of repair and minimize down time of the system. The example device 804 depicted in FIG. 9 includes an ADSL modem unit 902, a wireless broadband unit 904, an audiovisual component rack 906, an Ethernet bridge 908, a firmware drive 910, a digital video recorder (DVR) unit 912, a BTS receiver 914 and space for other possible units 916. This is just one example of how the plug-in modules could be arranged; other arrangements and combinations of units may be implemented by exemplary embodiments.

In exemplary embodiments, the device 804 is capable of interfacing with a broadband service via the ADSL modem unit 902 and providing Internet and television services to the respective televisions, computers and/or other devices that would utilize broadband. In addition, exemplary embodiments of the device 804 may be utilized to provide wireless broadband access via the wireless broadband unit 904. The device 804 depicted in FIG. 9 also includes the DVR unit 912 for recording, pausing, etc., television shows and movies. Exemplary embodiments of the device 804 include a method for connecting to a computer for the purpose of additional storage of recorded television shows and movies, as well as for the purpose of using the television screen as a monitor. Additional exemplary embodiments include software/firmware for surfing the Internet using a remote control. In exemplary embodiments, this software/firmware is updated using automatic updates to the device 804. Exemplary embodiments also support wireless keyboards for use as interface devices. Other exemplary embodiments include multiple Ethernet ports for connecting multiple computers.

Exemplary embodiments of the device 804 are engineered for use as a combination ADSL modem, BTS receiver and router. Exemplary embodiments of the device 804 have the capacity to be connected to an external ADSL modem that will bypass the internal ADSL modem yet still maintain complete functionality of other capacities of the device. In this manner, the device 804 may be installed at existing locations and interface to an existing modem. Exemplary embodiments of the device 804 utilize compartmentalized unit controllers for each separate function controller that the device 804 employs for the purpose(s) of changing each individual defective unit rather than having to replace the entire unit for a single unit controller failure. Exemplary embodiments reserve a number of channels utilizing user programmability (e.g., programming an IP address for a closed circuit television (CCTV) security system or surveillance system to a channel on the user receiver). In additional exemplary embodiments, the device 804 supports remote login via a static IP/voice protocol network (VPN) type connection for various programming and/or remote viewing purposes (e.g., viewing the user CCTV channel from another location, viewing user subscribed programming from another location, e.g., viewing files/folders/other data from a user computer. Additional exemplary embodiments utilize universal serial bus (USB) for various connection and/or backup, storage, and programmability.

Referring to FIG. 9, exemplary embodiments of the BTS receiver 914 include a channel selection interface for receiving a channel selection from a television viewer (e.g., via a remote controller device). In addition, the BTS receiver 914 includes a channel selection correlator for correlating the channel selection to an Internet address.

In exemplary embodiments this is performed by keeping a list of channels numbers and corresponding Internet addresses and accessing this list to perform the correlation. The BTS receiver 914 also includes a data requestor for requesting data from the Internet address via the DSL modem. In exemplary embodiments, this is performed by transmitting a request (e.g., via a transmitter) to the modem. An additional component of the BTS receiver 914 is a data receiver for receiving video data packets containing live streaming video content from the Internet address in response to the requesting. In exemplary embodiments this is performed by a receiver. The BTS receiver 914 also includes computer instructions (hardware and/or software) for assembling the video data packets into video signals for display on a television at the service location, and for transmitting the video signals to the television.

In exemplary embodiments, the device 804 includes all of the components depicted in FIG. 9. All or a subset of the components depicted in FIG. 9 may be utilized at a service location depending on the current configuration (hardware and/or software) and to the services provided at the service location. In this manner, new hardware is not required every time an upgrade is requested. For example, the device 804 may be utilized as a combination ADSL modem and router. Alternatively, it may be utilized as a secondary router. Another option is for the device 804 to be utilized as a BTS receiver and a secondary router that works off of an existing ADSL modem. Any combination of components in the device 804 may be utilized at a service location. Enabling and disabling particular components may be performed by software located in the device 804.

Figure 10:
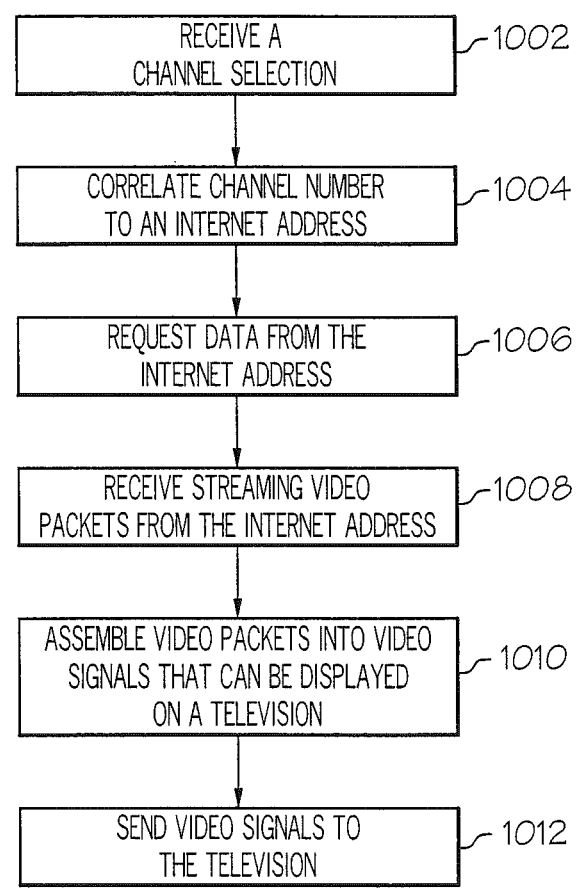
FIG. 10 is a process flow for providing BTS that may be implemented by exemplary embodiments.

FIG. 10 is a process flow for providing BTS that may be implemented by exemplary embodiments. In exemplary embodiments, the process flow depicted in FIG. 10 is implemented by software and/or hardware located in the BTS receiver 914. At block 1002 a channel selection is received at the BTS receiver 616. At block 1004, the channel number of the channel selection is correlated (by the BTS receiver 616) to an Internet address, and at block 1006 data is requested (by the BTS receiver 616) from the Internet address. Referring to the system in FIG. 6, in exemplary embodiments, the request travels from the BTS receiver 616 to the modem 618, to the DSLAM 604, and then to the ISP network 610 which services the request (e.g., including checking that the requestor has authority to access the data). At block 1008, video packets containing live streaming video content are received from the Internet address. Referring to the system in FIG. 6, in exemplary embodiments, the content travels from the Internet address 614, to the ISP network 610, to the DSLAM 604, to the modem 618, and then to the BTS receiver 616.

Referring to FIG. 10, at block 1010, the BTS receiver 616 assembles the received video packets into video signals that can be displayed on the television. At block 1012, the video signals are transmitted to the television. Blocks 1006-1012 are performed until the channel is deselected (e.g. power off, new channel selected).

As described above, exemplary embodiments can be in the form of computer-implemented processes and apparatuses for practicing those processes. Exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. Exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the present disclosure has been described with reference to exemplary embodiments, it will be understood by those skilled in the art that various changes may be made and equivalents may be substituted for elements thereof without departing from the scope. In addition, many modifications may be made to adapt a particular situation or material to the teachings of the present disclosure without departing from the essential scope thereof. Therefore, it is intended that the present disclosure not be limited to the particular exemplary embodiments disclosed for carrying out this invention, but that the present disclosure will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A system for providing broadband television service, the system comprising:
    a service location including:
        a telephone in communication with a digital subscriber line access multiplexer, the digital subscriber line access multiplexer providing telephone access to a telephone service provider;
        a broadband television service receiver including:
            a modem in communication with the digital subscriber line access multiplexer, the digital subscriber line access multiplexer providing Internet service to a computer through the modem;
            a channel selection interface for receiving a channel selection at the receiver,
            a channel selection correlator for correlating the channel selection to an Internet address,
            a data requestor for requesting data from the Internet address through the digital subscriber line access multiplexer via the modem, a data receiver for receiving video data packets containing live streaming video content from the Internet address in response to the requesting, the receiving from the digital subscriber line access multiplexer via the modem, and instructions for assembling the video data packets into video signals for display on a television at the service location, and for transmitting the video signals to the television;

a wireless broadband unit for providing wireless broadband access, the wireless broadband unit separate from the receiver and modem, an audio visual component, an Ethernet bridge, a firmware drive, and a digital video recorder, wherein one of the modem, the wireless broadband unit, the audio visual component, the Ethernet bridge, the firmware drive, and the digital video recorder is enabled in response to a current configuration at the service location and to services provided at the service location;

a connection for an external modem, the modem of the broadband television service receiver being bypassed upon connection to the external modem;

wherein the requesting, receiving video data packets, assembling and transmitting are performed until the channel has been deselected;

wherein the channel selection include a local television network and a national television network; and wherein the channel selection includes an internet protocol address for a closed circuit television (CCTV) system.

* * * * *